United States Patent [19]
Yamashita

[11] Patent Number: 5,639,533
[45] Date of Patent: Jun. 17, 1997

[54] DOOR WEATHER STRIP

[75] Inventor: Takashi Yamashita, Hiroshima, Japan

[73] Assignee: Nishikawa Rubber Co., Ltd., Hiroshima, Japan

[21] Appl. No.: 683,204

[22] Filed: Jul. 18, 1996

[30] Foreign Application Priority Data

Aug. 16, 1995 [JP] Japan .................................. 7-208823

[51] Int. Cl.$^6$ .................................................. E06B 7/16
[52] U.S. Cl. ........................... 428/99; 49/475.1; 49/479.1
[58] Field of Search .................... 428/122, 99; 49/475.1, 49/479.1, 495.1, 498.1, 490.1

[56] References Cited

U.S. PATENT DOCUMENTS 5,566,510  10/1996  Hollingshead et al. ................ 49/479.1

Primary Examiner—Alexander Thomas
Attorney, Agent, or Firm—Sughrue, Mion, Zinn, Macpeak & Seas

[57] ABSTRACT

Door weather strips comprises: a horizontal door glass plate channel weather strip for a front door which includes a horizontal channel member, and a horizontal lip whose sealing end face is flush with a sealing end face of the horizontal channel member; a horizontal/vertical door weather strip for a rear door which includes a horizontal channel member whose end face is defined by a sealing curved end face of a hollow vertical lip with the aid of a vertical lip, and a horizontal lip having a sealing curved end face which is curved towards the inside of a vehicle following the outer peripheral surface of the sealing curve end face of the hollow vertical lip. With the weather strips, the parting portion and the upper end portion of the center pillar section are more positively sealed.

5 Claims, 2 Drawing Sheets

DOOR WEATHER STRIP

BACKGROUND OF THE INVENTION

This invention relates to weather strips of automobiles, and more particularly to the structure of door weather strips which are arranged around the side parting portions and the upper end portion of a center pillar section in an automobile.

A four-door type automobile, as shown in FIG. 4, has a center pillar section CP between a front door FR and a rear door RR on each side thereof. For those doors FR and RR, sealing means are arranged around the side parting portions and the upper end portion of the center pillar section CP, as indicated in the circle A; more specifically door weather strips as shown in FIG. 5 are arranged along the center pillar section CP and the door frame 2.

FIG. 5 is a perspective view, with parts cut away, showing a horizontal door weather strip 3 for a front door, and a horizontal/vertical door weather strip 7 for a rear door.

The front door horizontal weather strip 3 is substantially G-shaped in cross-section. More specifically, the weather strip 3 comprises: a horizontal channel member 4 which has a longitudinal slit 6 (having a gap B) in the bottom wall into which a door sash is inserted; and a horizontal lip 5 which is extended longitudinally on the top wall of the channel member 4. One end portion of the horizontal lip 5 is extended towards the end face of a horizontal channel member 8 (described later) of the horizontal/vertical door weather strip 7, and is curved towards the inside of the automobile, thus forming a curved portion 5a.

The rear door horizontal/vertical weather strip 7 is substantially G-shaped in cross-section. More specifically, the weather strip 7 comprises: a horizontal channel member 8 which has a longitudinal slit 6 (having a gap B) in the bottom wall thereof into which a door sash is inserted; and a horizontal lip 9 which is extended longitudinally on the top wall of the channel member 8. One end portion of the horizontal lip 9 is extended towards the horizontal lip 5, and curved towards the inside of the automobile, thus forming a curved portion 9a which meets the curved end portion of the horizontal lip 5. The weather strip 7 further comprises: a hollow vertical lip 10 which is extended upwardly and has an upper end face 10a which supports one end portion of the horizontal lip 9. The hollow vertical lip 10 is coupled through a vertical lip 11, which is substantially L-shaped in section, to the horizontal channel member 8.

In the weather strips 3 and 7 thus formed, the end faces of the horizontal channel members 4 and 8 which are confronted with each other are so defined as to have an opening span D which is opened towards the inside of the automobile, having a width and an angle which are suitable for the center pillar section CP.

As was described above, in the door weather strips 3 and 7 fixed the center pillar section CP, the horizontal lip curved portions 5a and 9a are curved in the opposite directions and are held in sealing contact with each other. However, the horizontal lip curved portion 9a of the rear door RR suffers from the following difficulties: As the rear door RR is opened and closed, the curved portion 9a, depending on the length thereof, flexural rigidity, and curvature, is caught by the horizontal lip curved portion 5a, and may be curled outside of the automobile, thus adversely affecting the air-tightness and water-tightness of the weather strip.

On the other hand, the horizontal lip curved portion 5a may be prevented from being curled outside of the automobile by suitably determining the length, flexural rigidity and curvature. However, it should be noted that, in the prior art, the sealing is obtained by laying the flat-belt-shaped horizontal lips 5 and 9 over each other; that is, the sealing is effected in a single plane. That is, no back-up means is available when the sealing is made unsatisfactory. Hence, the conventional door weather strips cannot cope with an unexpected lessening of the sealing effect.

SUMMARY OF THE INVENTION

Accordingly, an object of the invention is to eliminate the above-described difficulties accompanying a conventional door weather strips. More particularly, an object of the invention is to provide door weather strips for an automobile which more positively and stably seal both doors which are opened and closed with respect to the center pillar section of the automobile.

The foregoing object of the invention has been achieved by the provision of door weather strips which seal the parting portion and the upper end portion of a center pillar section with vertical lips and horizontal lips comprising:

a horizontal door weather strip including;
   a horizontal channel member, and
   a horizontal lip whose sealing end face is flush with a sealing end face of the horizontal channel member; and a horizontal/vertical door weather strip including;
   a horizontal channel member whose end face is defined by a sealing curved end face of a hollow vertical lip with the aid of a vertical lip, and
   a horizontal lip having a sealing curved end face which is curved towards the inside of a vehicle following the outer peripheral surface of the sealing curve end face of the hollow vertical lip, wherein the sealing end face of the horizontal channel member and the sealing end face of the horizontal lip are abutted against the sealing curved end face of the hollow vertical lip and the sealing curved end face of the horizontal lip of the horizontal/vertical door weather strip, to seal the parting portion and the upper end portion of the center pillar section.

DETAILED DESCRIPTION OF THE PREFERRED EMBODIMENTS

Figure 4:
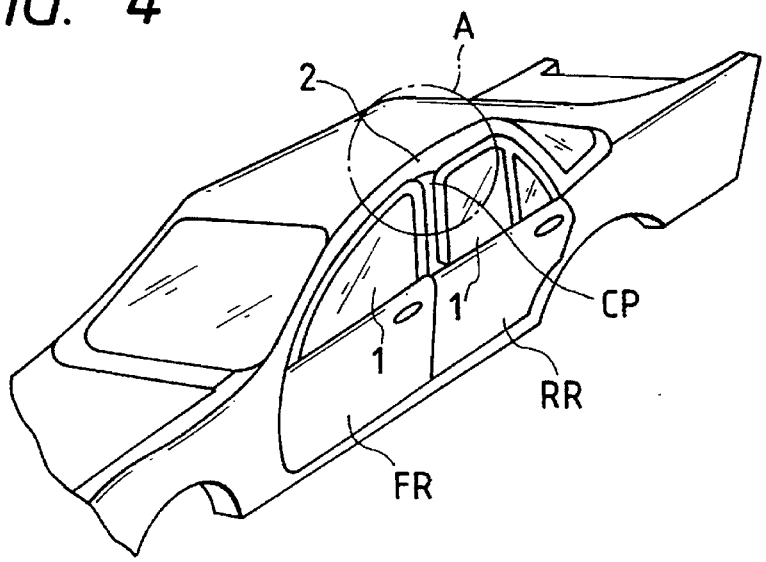
FIG. 4 is a perspective view of an automobile with the door weather strips according to the invention.
Figure 5:
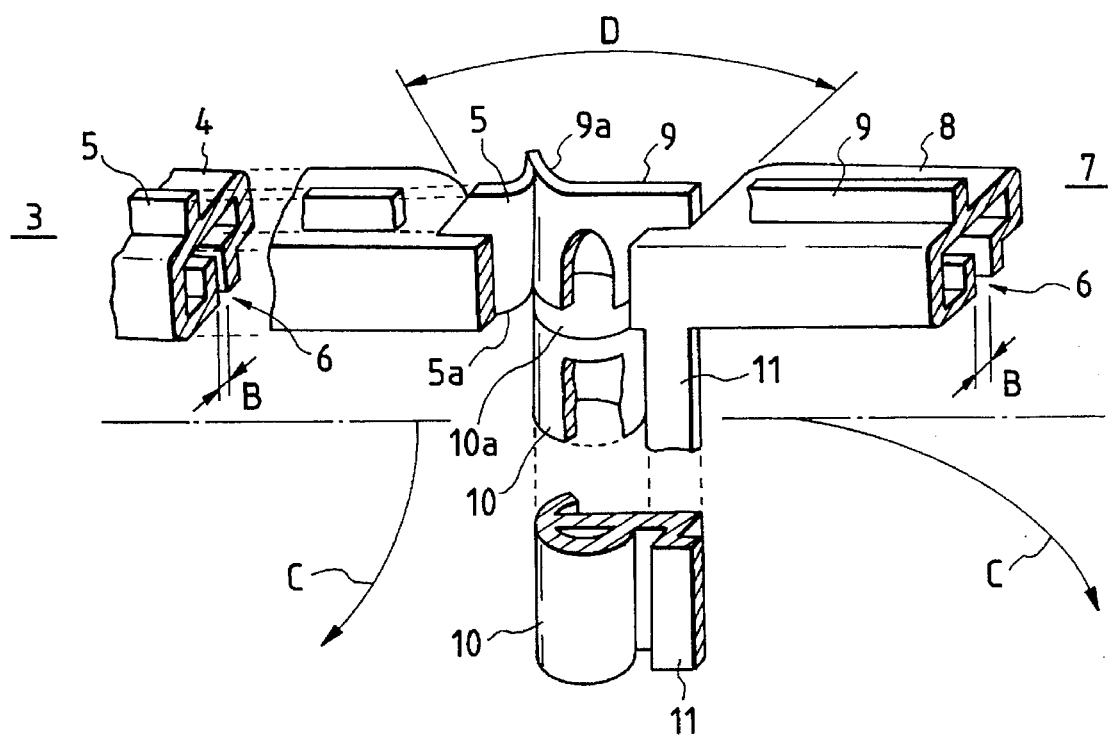
FIG. 5 is a perspective view of a conventional door weather strips.

A door weather strip, which constitutes an embodiment of the invention, will be described with reference to the accompanying drawings, in which parts corresponding functionally to those already described with reference to FIGS. 4 and 5 are therefore designated by the same reference numerals or characters.

Figure 1:
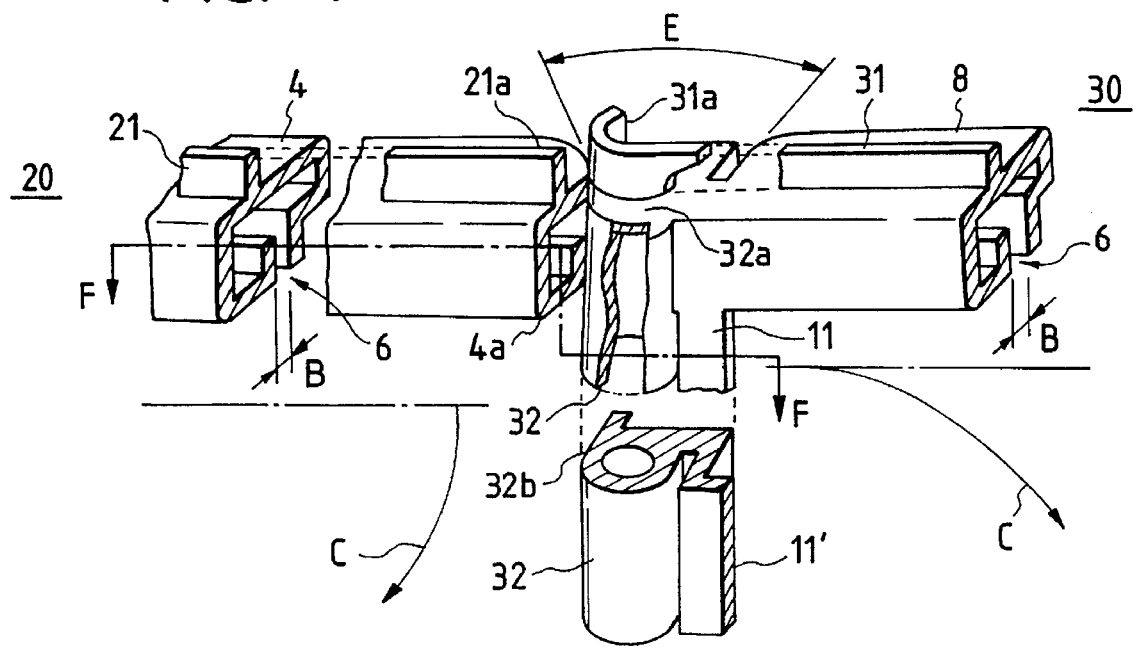
FIG. 1 is a perspective view of door weather strips, with parts cut away, which constitutes an embodiment of the invention.
Figure 2:
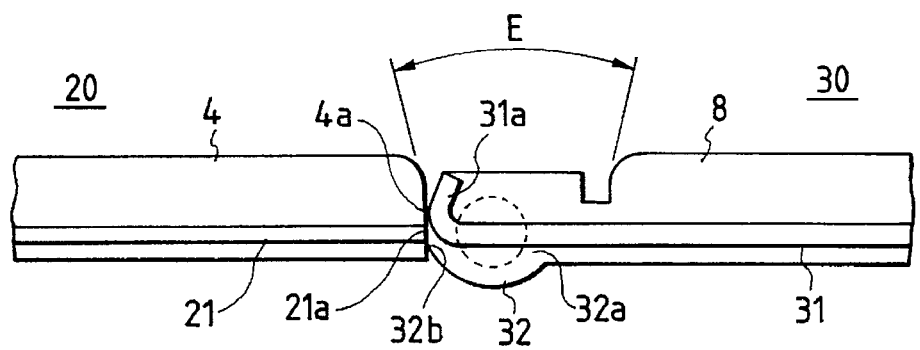
FIG. 2 is a plan view of the door weather strips shown in FIG. 1.
Figure 3:
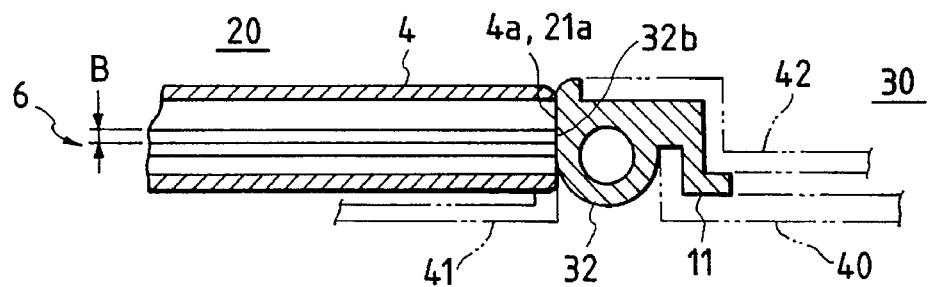
FIG. 3 is a sectional view taken along line F—F in FIG. 1.

FIG. 1 is a perspective view, with parts cut away, showing a front door horizontal weather strip 20, and a rear door horizontal/vertical weather strip 30. FIG. 2 is a plan view of those weather strips 20 and 30. FIG. 3 is a sectional view taken along line F—F in FIG. 1.

As was described with reference to FIG. 4, a four-door type automobile has a center pillar section CP between a front door FR and a rear door RR on each side thereof. Door weather strips 20 and 30 as shown in FIGS. 1 through 3 are provided around both side parting portions and upper end portion of the center pillar section; that is, they are means for sealingly fitting the door glass plates 1 in the front and rear doors FR and RR as indicated in the circle A.

The front door horizontal door weather strip 20 is substantially G-shaped in cross-section. More specifically, the weather strip 20 comprises: a horizontal channel member 4 which has a longitudinal slit 6 forming a small gap B in the bottom wall thereof into which a door sash is inserted; and a horizontal lip 21 which is extended longitudinally on the top wall of the horizontal channel member 4.

One end face 21a of the horizontal lip 21 is flush with the sealing end face of the horizontal channel member 4, confronting with the horizontal/vertical door weather strip 30 (described later).

The rear door horizontal/vertical weather strip 30 is also substantially G-shaped in cross-section. More specifically, the weather strip 30 comprises: a horizontal channel member 8 which has a longitudinal slit 6 forming a small gap B in the bottom wall thereof into which a door sash is inserted; and a horizontal slip 31 which is formed longitudinally on the top wall of the horizontal channel member 8. At the end of the horizontal channel member 8, the horizontal lip 31 has a sealing curved end face 31a which, with respect to the horizontal lip sealing end face 21a of the front door weather strip 20, is curved in the direction opposite to the rear door (RR) opening direction C (or curved towards the inside of the vehicle). The weather strip 30 further comprises: a hollow vertical lip 32 which is extended upwardly to have an upper end face 32a which supports the horizontal lip 31. The hollow vertical lip 32 is coupled through a vertical lip 11, which is substantially L-shaped in section, to the horizontal channel 8.

Garnishes 40 and 41, and a door sash 42 are arranged around the hollow vertical lip 32 and the L-shaped vertical lip 11.

The hollow vertical lip 32 of the invention is clearly different from the conventional one 10 (shown in FIG. 5) in the following points: The hollow vertical lip 32 is larger in cross-sectional area, thus being larger in thickness as viewed towards the inside of the vehicle. The upper end face 32a is larger in height than the conventional one 10a, thus being flush with the upper surface of the horizontal channel member 8. In addition, one side surface of the hollow vertical lip 32, which serves as a substantially sealing curved end face 32b of the horizontal channel member 8, is so compressed (or deformed) that it is brought into close contact with the sealing end face 4a of the horizontal channel member 4.

Accordingly, the horizontal lip 31 of the invention is smaller in the amount of protrusion (height) than the conventional one 9.

The door weather strips 20 and 30 thus designed has the end faces which are confronted with each other. With respect to the side parting portions and the upper end portion of the center pillar section CP, those end faces form an opening span E which is opened towards the inside the vehicle, providing a width and an angle which are suitable for installation of the strips on the center pillar section CP.

In the case of the opening span E of the invention, unlike the case of the conventional opening span D, it is unnecessary to protrude the sealing end face 21a of the horizontal lip 21 from the sealing end face 4a of the horizontal channel member 4. This feature makes it possible to decrease the opening width, and therefore the door weather strips are positively engaged with the center pillar section CP with higher accuracy.

In the door weather strips 20 and 30 engaged with the center pillar section CP, the horizontal lip sealing end faces 21a and 31a are relatively small in the amount of protrusion, and are not protruded from the horizontal channel member sealing end faces 4a and 42b, and are in contact with each other. And the sealing end face 4a of the one horizontal channel member 4 is kept in close contact with the sealing curved end face 32b of the hollow vertical lip 32 which substantially serves as the end face of the other horizontal channel member 8. Hence, compound effects are obtained in association with the great compressive deformation of the hollow vertical lip 32 which is larger in thickness and in height: That is, the door weather strips of the invention is free from the difficulty accompanying the conventional ones 3 and 7 that, as the rear door RR is opened and closed, the horizontal lip curved portion 9a of the rear door RR, being caught by the horizontal lip curved portion 5a of the front door FR, is curved in such as manner as to curl outside of the vehicle, with a result that the weather strips are lowered in air-tightness and the water-tightness.

Furthermore, the weather strips are sealingly installed with the aid of a plurality of faces of the horizontal lips and horizontal channel members a, and therefore the probability is markedly lowered that the weather strips become unsatisfactory in sealing effect; that is, the weather strips of the invention are maintained fine in sealing effect for a long time.

What is claimed is:

1. Door weather strips which seal the parting portion and the upper end portion of a center pillar section with vertical lips and horizontal lips comprising:

a horizontal door weather strip including;

a horizontal channel member, and a horizontal lip whose sealing end face is flush with a sealing end face of said horizontal channel member; and a horizontal/vertical door weather strip including;

a horizontal channel member whose end face is defined by a sealing curved end face of a hollow vertical lip with the aid of a vertical lip, and a horizontal lip having a sealing curved end face which is curved towards the inside of a vehicle following the outer peripheral surface of said sealing curve end face of said hollow vertical lip, wherein said sealing end face of said horizontal channel member and said sealing end face of said horizontal lip are abutted against said sealing curved end face of said hollow vertical lip and said sealing curved end face of said horizontal lip of said horizontal/vertical door weather strip.

2. The door weather strips of claim 1, wherein said horizontal door weather strip seals a front door.

3. The door weather strips of claim 1, wherein said horizontal/vertical door weather strip seals a rear door.

4. The door weather strips of claim 1, wherein said horizontal door weather strip is substantially G-shaped in cross-section.

5. The door weather strips of claim 1, wherein said horizontal/vertical door weather strip is substantially G-shaped in cross-section.

\* \* \* \* \*